No. 787,066. Patented April 11, 1905.

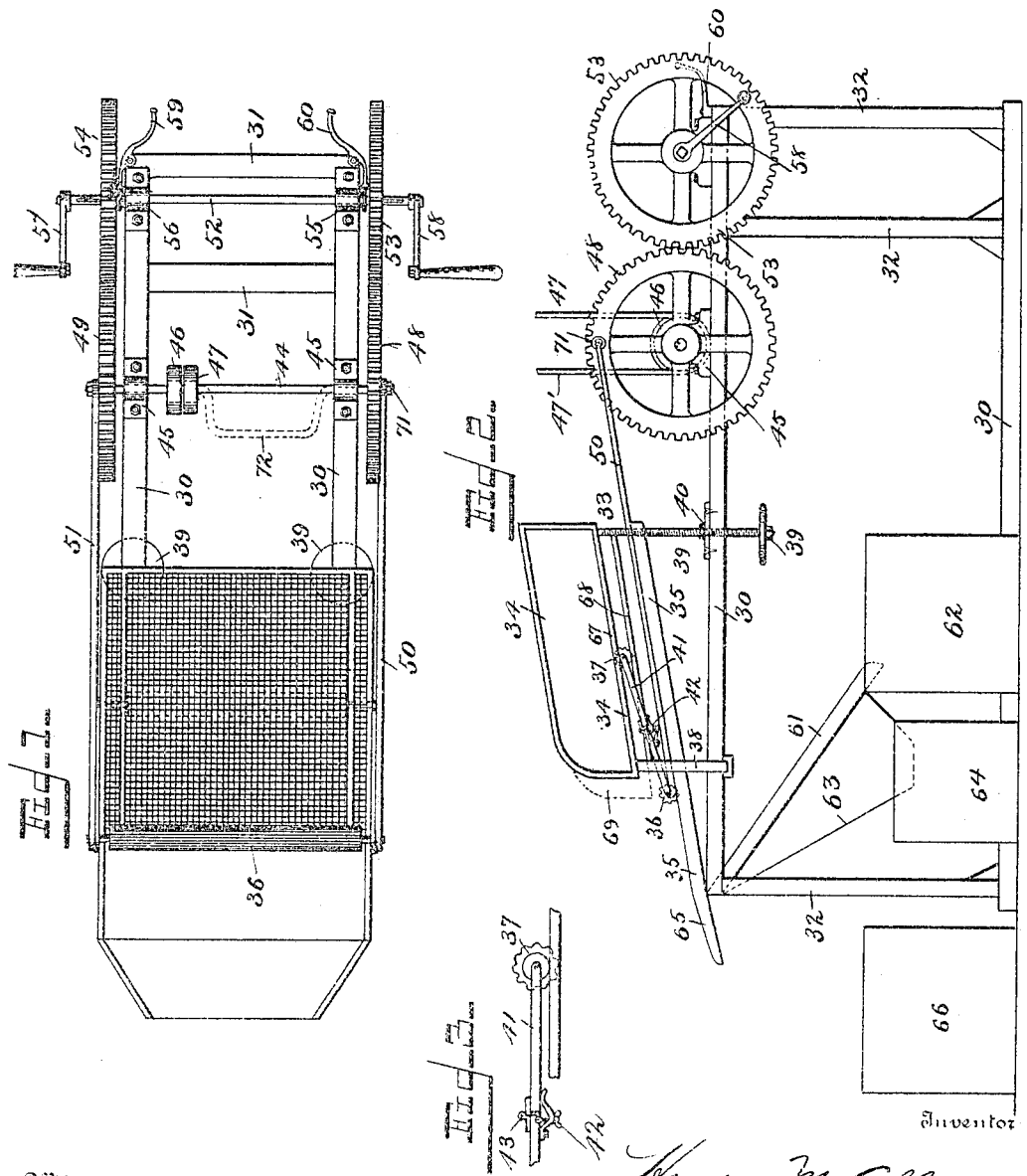

UNITED STATES PATENT OFFICE.

HENRY MATHEW ALLEYN, OF MASKELIYA, CEYLON.

APPARATUS FOR BREAKING AND GRADING MADE TEA-LEAVES OR THE LIKE.

SPECIFICATION forming part of Letters Patent No. 787,066, dated April 11, 1905.

Application filed July 19, 1902. Serial No. 116,225.

*To all whom it may concern:*

Be it known that I, HENRY MATHEW ALLEYN, planter, of Meria Cotta, Maskeliya, in the Colony of Ceylon, have invented certain new and useful Improvements in Apparatus for Breaking and Grading Made Tea-Leaves or the Like, of which the following is a specification.

This invention relates to improvements in apparatus and machinery for cutting, breaking, grading, or sifting made tea-leaf or other such substances; and it consists, first, in the designing, application, and use of rollers set in suitable frames rotated over or under or over and under a layer of made tea-leaf or other such substances spread on a sieve or perforated surface for the purpose of cutting, breaking, grading, or sifting made tea-leaf or other such substances, and thereby reducing it to any desired size according to the size of the mesh or perforations operated on; second, in the designing, application, and use of certain forms of tightening apparatus for the purpose of keeping the meshed or perforated surface or the attachments thereto on or under which the rollers work in a state of tension, and thereby increasing the intensity of the vibration and the sifting or grading action of such meshed or perforated surface.
In the drawings annexed hereto and which are to be read as part of the specification the same reference-numerals are used to indicate like parts in the figures in each sheet.

Figure 1 shows a plan of a sifting and grading machine fitted with stationary trays and movable breaker-rollers fitted in a suitable frame which can be worked by hand or power. Fig. 2 is a side elevation of same. Fig. 3 is a side elevation, to enlarged scale, of a spring attachment for keeping the under roller in contact with the under side of the sieve.

In the drawings the faces of the rollers are shown straight and corrugated; but they may be curved or rounded and be plain, faceted, fluted, or of any regular or irregular pattern, and they are worked by rotating by hand or power over a layer of made tea-leaf or other such substances spread on a sieve of any desired size of mesh, one roller being shown working in contact with the under side of the sieve.

Fig. 1 shows in plan, and Fig. 2 in elevation, a tea-grading machine which can be worked by hand or power and consists of a horizontal frame, of any suitable material, made up of four side pieces 30, two at top and two at bottom, joined to end pieces 31, and six standards or uprights 32, on which is superimposed a small frame 33, which carries the sieve-hopper 34, the main sieve 35, and the rollers 36 and 37. The front of the hopper is supported on each side by standards 38 and the back part by two adjusting-screws 39, working in nuts 40, attached to top of frame, which permits of the sieves being adjusted to any desired incline. The spindles of the rollers 36 and 37 are connected by a rod 41, the roller 37 being pressed up against the under side of sieve 34' by means of a plate-spring 42, attached to under side of rod 41, which is hinged in the center 43, the forward end of the plate-spring 42 being fixed to rod, the other end being free to press the roller up against the under side of the sieve, the pressure being adjustable by means of thumb-screw 42' abutting on bar 41 a little beyond hinge 43.

The working gear consists of a shaft 44, revolving in bearings 45, attached to top bars of frame, said shaft having fitted on it fast and loose pulleys 46 and 47, with belt 47' for power working. On each end of shaft 44 are fitted two eccentric wheels having cogged faces 48 and 49, one on each side, which are connected to spindle of breaker-roller 36 by rods 50 and 51, so that rollers 36 and 37 are moved to and fro at each revolution of shaft 44. For working by manual another shaft 52, having pinions 53 and 54, which gear with the eccentrics 48 and 49, is mounted in suitable bearings 55 and 56, attached to top of frame, said shaft having crank-handles 57 and 78 for working by hand. The eccentrics 48 and 49 are fitted on shaft 44 by means of fixed keys; but the pinions 53 and 54 are loose-keyed on shaft 52, the keys being countersunk in the shaft to permit of the pinions 53 and 54 being thrown out of gear by forked levers 59 and 60 when working by power. Two pinions are shown, but when desired one will suffice. When it is intended to work solely by power, the arrangement described for working by hand may be dispensed with, together with the part of the frame on which it is seated.

Two other methods may be used for working this machine by hand: (*a*) by attaching the straight portion of crank 58 to eccentric-pin 71 outside connecting-rod 50 and (*b*) by cranking shaft 44, as shown by broken lines 72. When either of these methods is used, the arrangement above described, with its framework for working by manual, may be dispensed with and the face of the eccentrics 48 and 49 need not be toothed.

To prevent rollers 37 from sagging, a loose wheel 67, fitted on the roller-axle at each end, rests and revolves on bar 68 as it travels to and fro under hopper-sieve 34'.

To work the machine, the tea-leaf or other such substance is fed into the upper end of the sieve-hopper 34. On turning the handles 56 and 57 the roller 37 moves to and fro under and against the sieve 34', which throws the mesh into a state of quick vibration. The tea is thereby sifted, the coarser leaf passing out into a receptacle 69 at toe of hopper 34, while the small leaf falls through onto main sieve 35, where it is broken and sifted by the action of rollers 36. The fine broken leaf sifts through onto a fine-meshed stationary sieve 61, whence it rolls down into box 62. At the same time the dust passes through sieve 61 and falls on guide 63 and thence into dust-box 64. Any large leaf unbroken on sieve 35 passes over lip 65 and falls into box 66.

Only two rollers are shown; but more may be used by lengthening the frame and connecting the axles of the rollers by rods. Further, the rollers may be made stationary by seating their axles in bearings on a fixed bar and the sieves given a reciprocative motion by fitting them with an axle and a pair of wheels at each end and the wheels made to travel over a fixed rail on each side.

I do not limit myself to the exact apparatus and machinery hereinbefore described, as such may be varied considerably without departing from the principle or the essence of the invention.

Having now particularly described and ascertained the nature of my invention and in what manner the same is to be performed, I declare that what I claim as novel and for which I seek protection is—

1. The combination with a sieve-hopper, and a main sieve 35, adapted for adjustment to a desired incline, of rollers 36, 37, the spindles of which are connected, said rollers being arranged to coöperate with the sieve in the hopper and the main sieve, and means for varying the pressure of the roller 37.

2. The combination with a sieve-hopper, and a main sieve 35, adapted for adjustment to a desired incline, of rollers 36, 37, the spindles of which are connected, said rollers being arranged to coöperate with the sieve in the hopper and the main sieve, and means for varying the pressure of the roller 37, and means for preventing sagging of the roller 37.

In testimony that I claim the foregoing as my invention I have signed my name, in the presence of two subscribing witnesses, at Colombo, in the Colony of Ceylon, on the 12th day of June, 1902.

HENRY MATHEW ALLEYN.

Witnesses:
    E. L. MOREY,
    S. A. FRERA.